United States Patent
Kane et al.

(10) Patent No.: US 11,644,226 B2
(45) Date of Patent: May 9, 2023

(54) VARIABLE SPEED DRIVE INPUT CURRENT CONTROL

(71) Applicant: Johnson Controls Technology Company, Auburn Hills, MI (US)

(72) Inventors: Ajit W. Kane, York, PA (US); Scott V. Slothower, Dillsburg, PA (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 0 days.

(21) Appl. No.: 16/649,852

(22) PCT Filed: Sep. 24, 2018

(86) PCT No.: PCT/US2018/052502
§ 371 (c)(1),
(2) Date: Mar. 23, 2020

(87) PCT Pub. No.: WO2019/060859
PCT Pub. Date: Mar. 28, 2019

(65) Prior Publication Data
US 2020/0278141 A1  Sep. 3, 2020

Related U.S. Application Data

(60) Provisional application No. 62/563,039, filed on Sep. 25, 2017.

(51) Int. Cl.
*F25B 49/02* (2006.01)
*H02P 27/06* (2006.01)

(52) U.S. Cl.
CPC .......... *F25B 49/025* (2013.01); *F25B 49/022* (2013.01); *H02P 27/06* (2013.01); *F25B 2700/151* (2013.01)

(58) Field of Classification Search
CPC ............................ F25B 49/022; F25B 49/025
See application file for complete search history.

(56) References Cited

U.S. PATENT DOCUMENTS 2,770,106 A   11/1956   Moody
2,921,445 A   1/1960    Ashley et al.
(Continued)

FOREIGN PATENT DOCUMENTS

CN   101861695 A   10/2010
CN   105227016 A   1/2016
(Continued)

OTHER PUBLICATIONS

International Search Report and Written Opinion on International Patent Application No. PCT/US2018/052502 dated Dec. 12, 2018, 13 pages.

(Continued)

*Primary Examiner* — Jonathan Bradford
(74) *Attorney, Agent, or Firm* — Fletcher Yoder, P.C.

(57) ABSTRACT

A chiller assembly is provided. The chiller assembly includes a compressor (102), a condenser (106), an expansion device and an evaporator (108) connected in a closed refrigerant circuit. The chiller assembly further includes a motor (104) connected to the compressor to power the compressor, and a variable speed drive (110) connected to the motor to power the motor. The variable speed drive is operable to provide a variable voltage to the motor and a variable frequency to power the motor. The variable speed drive includes multiple sensors and an input current estimator that determines an estimated RMS input current based on sensor data received from the sensors. The chiller assembly further includes a control panel to control operation of the variable speed drive.

20 Claims, 4 Drawing Sheets

(56) References Cited

U.S. PATENT DOCUMENTS

| | | | |
|---|---|---|---|
| 3,149,478 A | 9/1964 | Anderson et al. | |
| 3,645,112 A | 2/1972 | Mount et al. | |
| 4,182,137 A | 1/1980 | Erth | |
| 4,581,900 A * | 4/1986 | Lowe | H02H 3/44 |
| | | | 415/17 |
| 5,917,428 A * | 6/1999 | Discenzo | G01R 31/343 |
| | | | 340/870.01 |
| 6,032,472 A | 3/2000 | Heinrichs et al. | |
| 6,070,421 A | 6/2000 | Petrovich et al. | |
| 6,237,353 B1 | 5/2001 | Sishtla et al. | |
| 6,370,888 B1 | 4/2002 | Grabon | |
| 6,460,371 B2 | 10/2002 | Kawada | |
| 6,506,031 B2 | 1/2003 | Sishtla | |
| 6,537,032 B1 | 3/2003 | Horiuchi et al. | |
| 7,181,928 B2 | 2/2007 | De Larminat | |
| 7,557,549 B2 | 7/2009 | Underhill | |
| 7,856,292 B2 | 12/2010 | Crane et al. | |
| 8,021,127 B2 | 9/2011 | De Larminat | |
| 8,397,534 B2 | 3/2013 | Doty et al. | |
| 8,424,339 B2 | 4/2013 | Sommer | |
| 8,434,323 B2 | 5/2013 | Welch et al. | |
| 8,465,265 B2 | 6/2013 | De Larminat | |
| 8,516,850 B2 | 8/2013 | Jadric et al. | |
| 8,931,304 B2 | 1/2015 | Beers et al. | |
| 8,959,950 B2 | 2/2015 | Doty et al. | |
| 9,291,166 B2 | 3/2016 | De Larminat et al. | |
| 9,291,167 B2 | 3/2016 | Schreiber | |
| 2005/0188709 A1 * | 9/2005 | Manole | F25B 49/02 |
| | | | 62/180 |
| 2007/0271956 A1 | 11/2007 | Smith et al. | |
| 2008/0117559 A1 | 5/2008 | Underhill | |
| 2008/0223057 A1 | 9/2008 | Lifson et al. | |
| 2009/0024257 A1 | 1/2009 | Crane et al. | |
| 2009/0109713 A1 * | 4/2009 | Schnetzka | H02M 5/4585 |
| | | | 363/34 |
| 2010/0006265 A1 | 1/2010 | De Larminat et al. | |
| 2011/0138826 A1 | 6/2011 | Lifson et al. | |
| 2012/0100011 A1 | 4/2012 | Sommer et al. | |
| 2012/0256580 A1 * | 10/2012 | Yu | H02P 1/28 |
| | | | 318/779 |
| 2012/0315151 A1 * | 12/2012 | Hamdan | H02P 29/027 |
| | | | 417/44.11 |
| 2013/0302184 A1 | 11/2013 | Sishtla | |
| 2014/0057103 A1 | 2/2014 | Mozsgai et al. | |
| 2014/0084836 A1 * | 3/2014 | Pham | F04C 18/0215 |
| | | | 318/490 |
| 2014/0233278 A1 | 8/2014 | Li et al. | |
| 2014/0271232 A1 | 9/2014 | Kopko | |
| 2015/0056059 A1 * | 2/2015 | Crane | F04D 27/002 |
| | | | 415/1 |
| 2015/0330693 A1 | 11/2015 | Sykora et al. | |
| 2016/0146523 A1 * | 5/2016 | Hatakeyama | F25B 13/00 |
| | | | 62/324.6 |
| 2016/0365817 A1 | 12/2016 | Schuster et al. | |
| 2017/0241691 A1 | 8/2017 | Yamakawa et al. | |

FOREIGN PATENT DOCUMENTS

| | | |
|---|---|---|
| CN | 106233596 A | 12/2016 |
| CN | 107155396 A | 9/2017 |
| EP | 1 119 732 A1 | 8/2001 |
| EP | 3 059 846 A1 | 8/2016 |
| JP | 2011200013 A | 10/2011 |
| JP | 2015528561 A | 9/2015 |
| WO | WO-2007/050063 | 5/2007 |
| WO | WO-2009/134770 | 11/2009 |
| WO | WO-2010/017033 | 2/2010 |
| WO | WO-2013/018611 A1 | 2/2013 |
| WO | WO-2013/039572 A1 | 3/2013 |
| WO | WO-2014/039155 A2 | 3/2014 |
| WO | WO-2014/084989 A2 | 6/2014 |
| WO | WO-2014/089551 A1 | 6/2014 |
| WO | WO-2014/117015 A1 | 7/2014 |
| WO | 2014127090 A2 | 8/2014 |
| WO | WO-2014/200476 A1 | 12/2014 |
| WO | WO-2015/053939 A1 | 4/2015 |
| WO | WO-2015/116447 A1 | 8/2015 |
| WO | WO-2016/003467 | 1/2016 |

OTHER PUBLICATIONS

Chinese Office Action for CN Application No. 201880061254.0, dated Mar. 2, 2021, 12 pgs.

Japanese Office Action for JP Application No. 2020-516825, dated Jun. 7, 2022, 5 pages.

Chinese Notice of Allowance for CN Application No. 201880061254.0, dated Aug. 6, 2021, 3 pgs.

\* cited by examiner

VARIABLE SPEED DRIVE INPUT CURRENT CONTROL

CROSS-REFERENCE TO RELATED PATENT APPLICATIONS

This application is a U.S. National Stage Application of PCT/US2018/052502, filed Sep. 24, 2018, which claims the benefit of and priority to U.S. Provisional Application No. 62/563,039, filed Sep. 25, 2017, both of which are incorporated herein by reference in their entirety.

BACKGROUND

Buildings can include heating, ventilation and air conditioning (HVAC) systems.

SUMMARY

One implementation of the present disclosure is a chiller assembly. The chiller assembly includes a compressor, a condenser, an expansion device and an evaporator connected in a closed refrigerant circuit. The chiller assembly further includes a motor connected to the compressor to power the compressor, and a variable speed drive connected to the motor to power the motor. The variable speed drive is operable to provide a variable voltage to the motor and a variable frequency to power the motor. The variable speed drive includes multiple sensors and an input current estimator that determines an estimated RMS input current based on sensor data received from the sensors. The chiller assembly further includes a control panel to control operation of the variable speed drive.

Yet another implementation of the present disclosure is a method of controlling a chiller assembly according to an estimated input RMS current. The method includes determining a DC link power value, determining a line-to-line input voltage value, determining an input current value, and determining an input current with distortion value. The method further includes determining a transformer current value, determining a total input RMS current value, and performing an input RMS current response action.

Still another implementation of the present disclosure is a processing circuit for a variable speed drive of a chiller assembly. The processing circuit includes a processor and memory communicably coupled to the processor and operable to execute a method for controlling the chiller assembly according to an estimated input RMS current. The method includes determining a DC link power value, determining a line-to-line input voltage value, determining an input current value, and determining an input current with distortion value. The method further includes determining a transformer current value, determining a total input RMS current value, and performing an input RMS current response action.

DETAILED DESCRIPTION

The present disclosure relates generally to an input current control feature for a variable speed drive (VSD). The VSD can provide power having a variable voltage and frequency to a motor. VSDs can have higher output current ratings than input current ratings. For example, a VSD with an output current rating of 420 amps can have an input current rating of 390 amps, while a VSD with an output current rating of 780 amps can have an input current rating of 600 amps. A VSD having a rated frequency of 60 Hz can operate by measuring the output current and assuming the input current is the same, but this assumption does not work well for VSDs having higher frequency ratings (e.g., 110 Hz, 210 Hz). In addition, when a VSD is implemented in a chiller assembly, optimal performance of the chiller assembly is achieved when the output and input current ratings are different. Systems and methods that estimate the VSD input current utilizing existing VSD sensors and circuitry is described herein.

Figure 1:
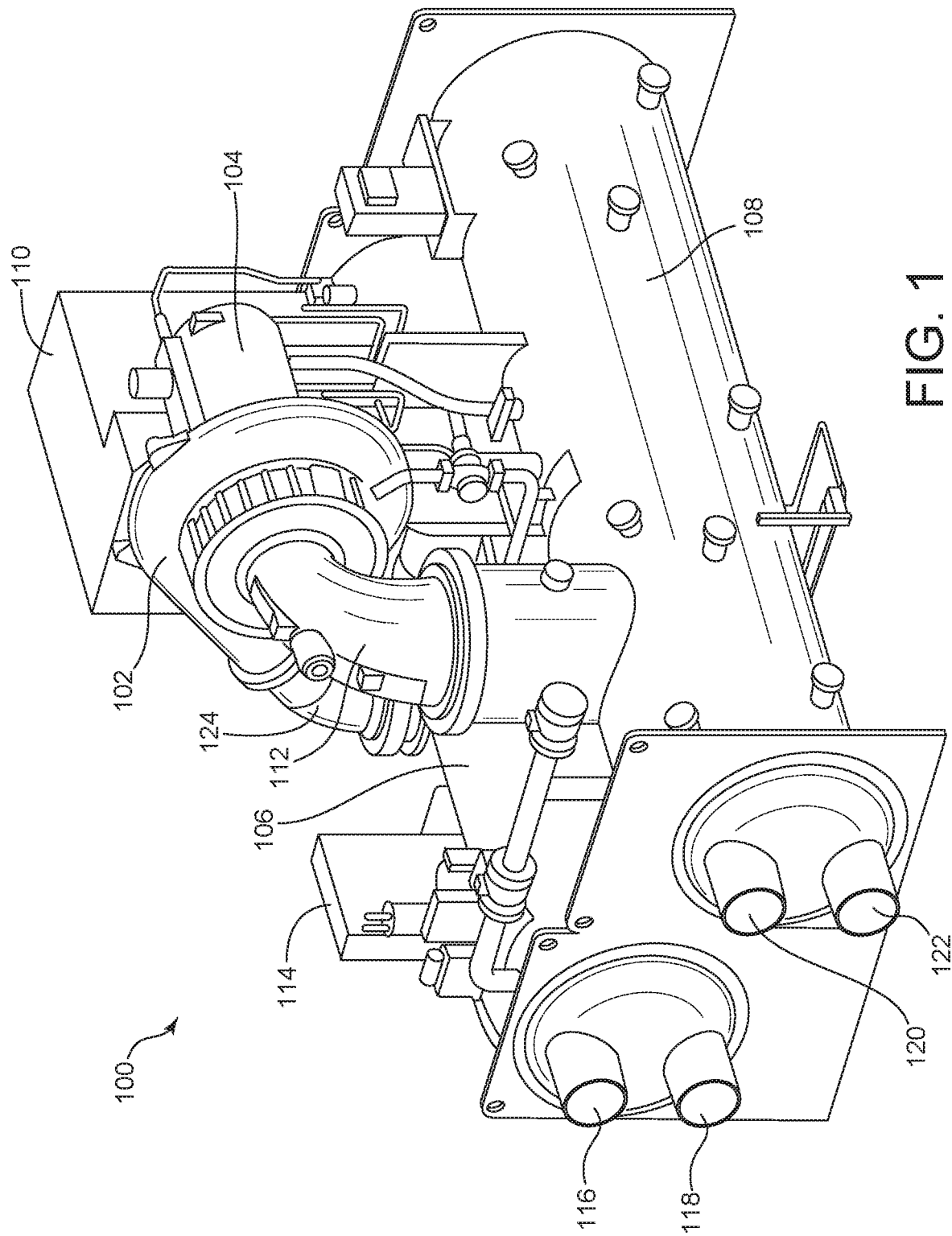
FIG. 1 is a perspective view drawing of a chiller assembly, according to some embodiments.

Referring generally to the FIGURES, a chiller assembly having a VSD that operates according to an input control system is shown. Referring to FIG. 1, among others, an example implementation of a chiller assembly 100 is depicted. Chiller assembly 100 can include a compressor 102 driven by a motor 104, a condenser 106, and an evaporator 108. A refrigerant is circulated through chiller assembly 100 in a closed vapor compression cycle refrigerant circuit. Chiller assembly 100 can also include a control panel 114 to control operation of the vapor compression cycle within chiller assembly 100.

Figure 2:
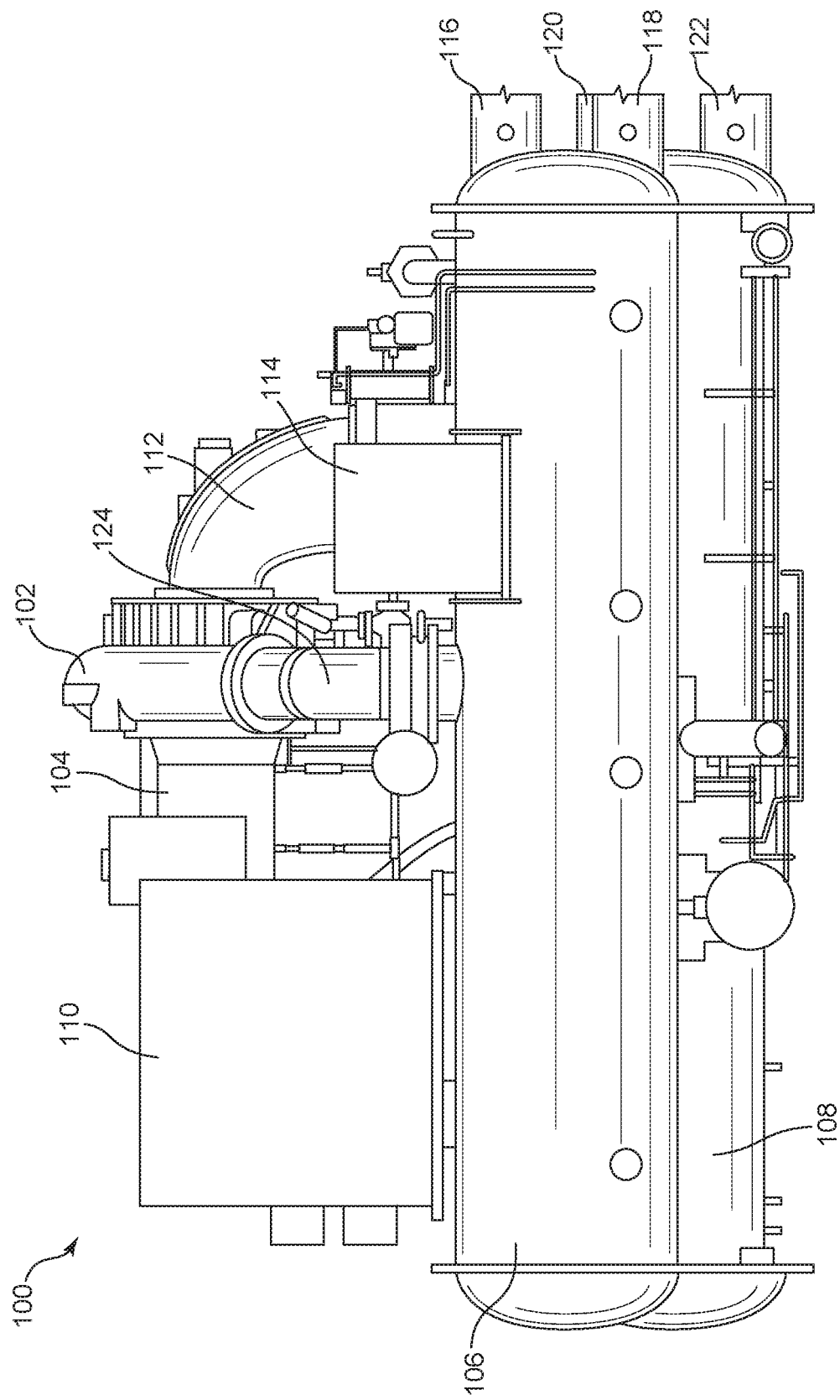
FIG. 2 is an elevation view drawing of the chiller assembly of FIG. 1, according to some embodiments.

Motor 104 can be powered by a VSD 110. VSD 110 receives alternating current (AC) power having a particular fixed line voltage and fixed line frequency from an AC power source (see FIG. 2 below) and provides power having a variable voltage and frequency to motor 104. The VSD 110 can provide AC power to the motor 104 having higher voltages and frequencies and lower voltages and frequencies than the rated voltage and frequency of motor 104. Motor 104 can be any type of electric motor than can be powered by a VSD 110. For example, motor 104 can be a high speed induction motor. Compressor 102 is driven by motor 104 to compress a refrigerant vapor received from evaporator 108 through suction line 112 and to deliver refrigerant vapor to condenser 106 through a discharge line 124. Compressor 102 can be a centrifugal compressor, a screw compressor, a scroll compressor, a turbine compressor, or any other type of suitable compressor.

Evaporator 108 includes an internal tube bundle, a supply line 120 and a return line 122 for supplying and removing a process fluid to the internal tube bundle. The supply line 120 and the return line 122 can be in fluid communication with a component within a HVAC system (e.g., an air handler) via conduits that that circulate the process fluid. The process fluid is a chilled liquid for cooling a building and can be, but is not limited to, water, ethylene glycol, calcium chloride brine, sodium chloride brine, or any other suitable liquid. Evaporator 108 is configured to lower the temperature of the process fluid as the process fluid passes through the tube bundle of evaporator 108 and exchanges heat with the refrigerant. Refrigerant vapor is formed in evaporator 108 by the refrigerant liquid delivered to the evaporator 108 exchanging heat with the process fluid and undergoing a phase change to refrigerant vapor.

Refrigerant vapor delivered by compressor 102 to condenser 106 transfers heat to a fluid. Refrigerant vapor condenses to refrigerant liquid in condenser 106 as a result of heat transfer with the fluid. The refrigerant liquid from condenser 106 flows through an expansion device and returns to evaporator 108 to complete the refrigerant cycle of the chiller assembly 100. Condenser 106 includes a supply line 116 and a return line 118 for circulating fluid between the condenser 106 and an external component of the HVAC system (e.g., a cooling tower). Fluid supplied to the condenser 106 via return line 118 exchanges heat with the refrigerant in the condenser 106 and is removed from the condenser 106 via supply line 116 to complete the cycle. The fluid circulating through the condenser 106 can be water or any other suitable liquid.

The refrigerant can have an operating pressure of less than 400 kPa or approximately 58 psi. For example, the refrigerant can be R1233zd. R1233zd is a non-flammable fluorinated gas with low Global Warming Potential (GWP) relative to other refrigerants utilized in commercial chiller assemblies. GWP is a metric developed to allow comparisons of the global warming impacts of different gases, by quantifying how much energy the emissions of 1 ton of a gas will absorb over a given period of time, relative to the emissions of 1 ton of carbon dioxide.

Figure 3:
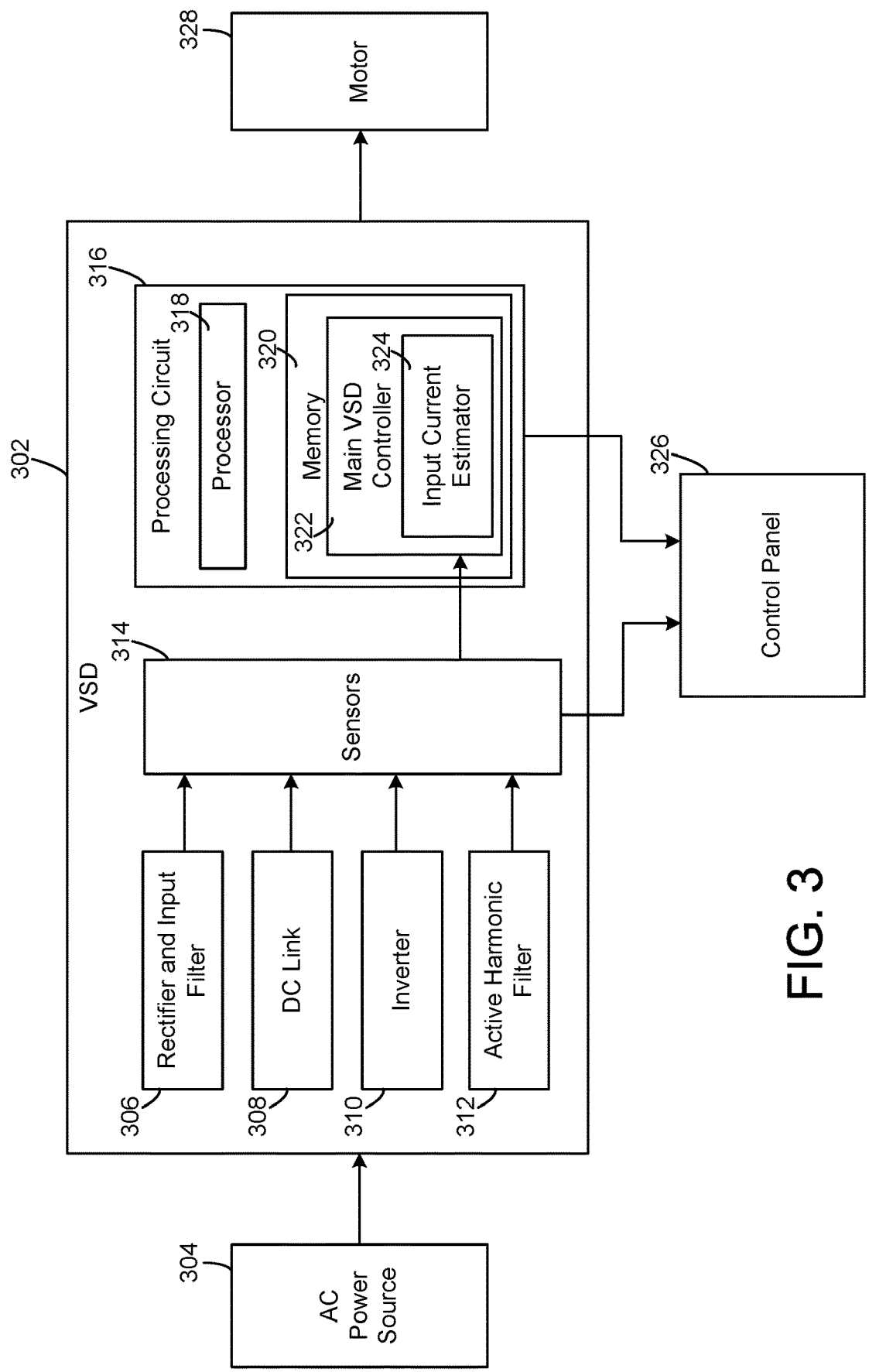
FIG. 3 is a schematic diagram of a variable speed drive that can be utilized in the chiller assembly of FIG. 1, according to some embodiments.

Referring to FIG. 3, a schematic diagram of a VSD 302 that can be utilized in chiller assembly 100 is shown, according to some embodiments. In various embodiments, the VSD 302 is identical or substantially similar to the VSD 110, described above with reference to FIGS. 1-2. The VSD 302 is shown to receive AC power from an AC power source 304 at a fixed AC input voltage and frequency and to output power to a motor 328 at a variable voltage and variable frequency.

The VSD 302 is shown to include, among other components, a rectifier and input filter 306, a DC link 308, and an inverter 310. The rectifier and input filter 306 converts the fixed line frequency, fixed line voltage from the AC power source 304 into DC power. Based on the location in which the chiller assembly and VSD 302 are installed, the fixed line frequency may be alternatively 50 Hz or 60 Hz. The DC link 308 filters the DC power from the a rectifier and input filter 306 and provides energy storage components. The DC link 308 can include capacitors, inductors, or a combination thereof that include passive devices that exhibit high reliability rates and very low failure rates. Finally, the inverter 310 converts the DC power from the DC link 308 into variable frequency, variable voltage AC power for motor 104. The inverter 310 can be a power module that that can include power transistors, insulated gate bipolar transistor (IGBT) power switches and inverse diodes interconnected with wire bond technology.

In some implementations, the VSD 302 further includes an active harmonic filter component 312. The active harmonic filter may act to eliminate harmonic distortions, which are currents and voltages that are continuous multiples of the 50 or 60 Hz fundamental frequencies. In various implementations, the active harmonic filter component 312 may include an array of capacitors, inductors, and resistors that deflect harmonic currents to the ground. The presence or absence of an enabled active harmonic filter 312 may affect a value of an estimated input current with distortion. Further details of the calculation of a value of an estimated input current with distortion are included below with reference to FIG. 4.

Still referring to FIG. 3, the VSD 302 is shown to include a processing circuit 316 including a processor 318 and memory 320. Processing circuit 316 may be communicably connected to control panel 326 such that processing circuit 316 and the various components thereof may send and receive data. Processor 318 may be implemented as a general purpose processor, an application specific integrated circuit (ASIC), one or more field programmable gate arrays (FPGAs), a group of processing components, or other suitable electronic processing components.

Memory 320 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 320 may be or include volatile memory or non-volatile memory. Memory 320 may include database components, object code components, script components, or any other type of information structure for supporting the various activities and information structures described in the present application. According to some embodiments, memory 320 is communicably connected to processor 318 via processing circuit 316 and includes computer code for executing (e.g., by processing circuit 316 and/or processor 318) one or more processes described herein.

The main VSD controller 322 may be configured to work with the control panel 326 to implement an input current control system. Based on data received from the sensors 314, the input current estimator 324 may implement a process (described in further detail with reference to FIG. 4 below) to estimate the total input current to the VSD 302. Sensors 314 may be communicably coupled to the rectifier and input filter 306, the DC link 308, the inverter 310, and the active harmonic filter 312 to provide sensor data to the main VSD controller 322. In various implementations, the sensors 314 may be any suitable type of current or voltage sensors. Sensor data provided to the main VSD controller 322 may include, but is not limited to an output current value, a DC link current value, and a DC link voltage value.

In some implementations, the control panel 326 can perform an action when an input current limit is approached or violated based on the estimated input current determined by the input current estimator 324. For example, the control panel 326 can act to reduce a chiller load if the estimated input current determined by the input current estimator 324 is approaching an input current limit. In other implementations, the control panel 326 may include or may be communicably coupled to a display screen where a technician or user supervising the operation of the chiller assembly can view operational alarms. If the input current estimator 324 determines that an input current has exceeded or is approaching a limit, the input current estimator 324 may transmit a signal to the control panel 326 to display a input current warning or alarm message.

Figure 4:
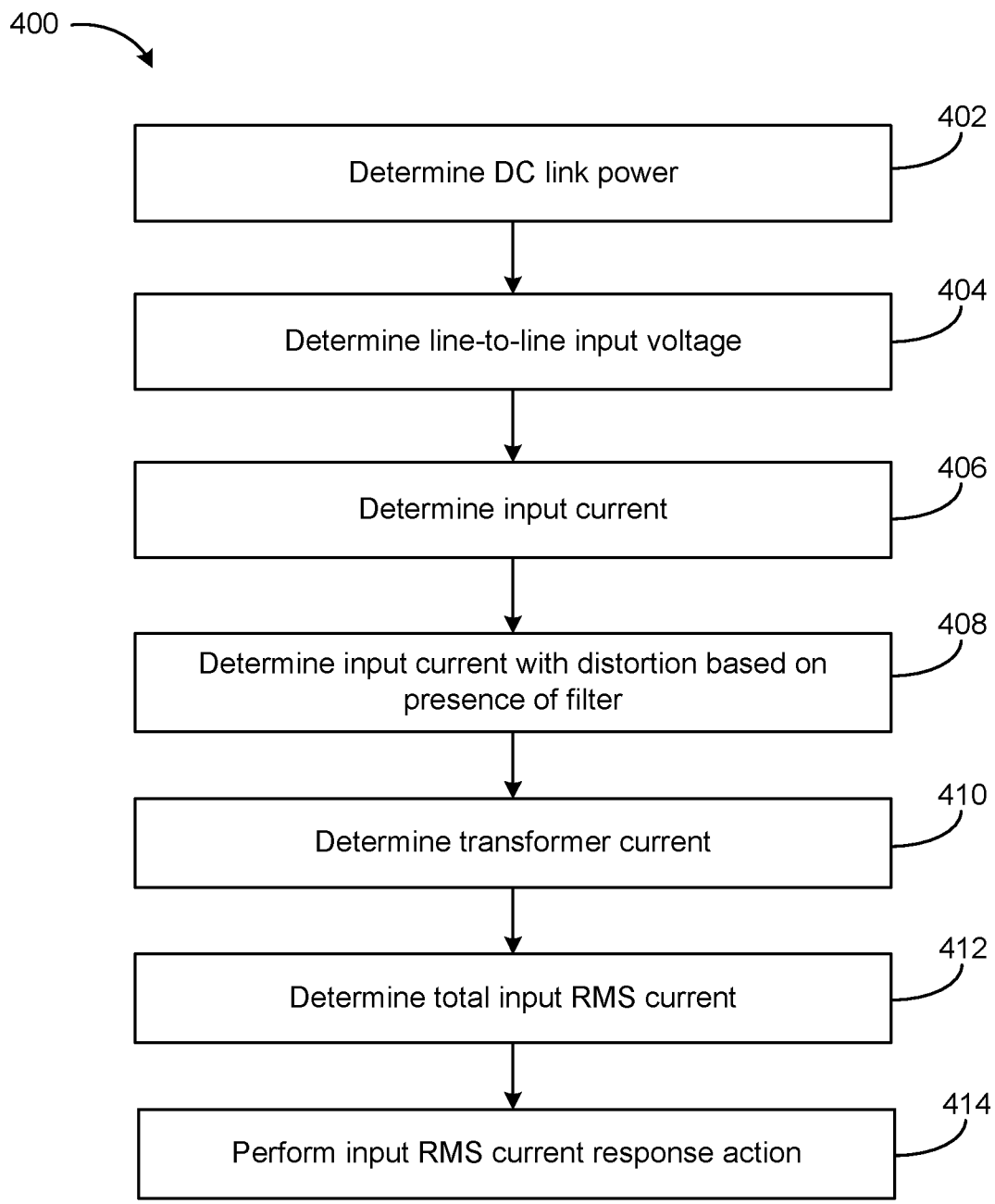
FIG. 4 is a flow diagram of an input current estimation and control process that can be performed by the variable speed drive of FIG. 3, according to some embodiments.

Turning now to FIG. 4, a flow chart of a process 400 for controlling a chiller assembly based on an estimated input current is depicted. In various embodiments, process 400 is performed by the input current estimator 324 of the VSD 302 and the control panel 326, described above with reference to FIG. 3. Process 400 is shown to commence with act 402, in which the input current estimator 324 determines the DC link power. The DC link power may be calculated according to Joule's law by multiplying a DC link voltage value by a DC link current value. For example, the DC link voltage value may be obtained by a sensor 314 that is coupled to the DC link component 308, and the DC link current value may be obtained by a sensor 314 that is coupled to the inverter component 310.

Act 404 may continue as the input current estimator 324 determines a line-to-line input voltage. The equation for line-to-line input voltage may be as follows:

$$\frac{\text{Line to Line}}{\text{Input Voltage}} = \frac{\left(\begin{array}{c}\text{DC Link Voltage} + 6\text{ Input Line Frequency} * \\ \text{Line Inductance} * \text{DC Link Current}\end{array}\right) * \pi}{\sqrt{2} * 3}$$

As noted above, the DC link voltage may be obtained from DC link component 308, while the DC link current may obtained from inverter component 310. The input line frequency may be obtained from the AC power source 304 and may be either 50 Hz or 60 Hz, depending on the location in which the chiller assembly, and by extension the VSD 302, is installed. The line inductance may be property characteristic of the VSD model. Sample line inductance values presented in microhenries (µH) are included in Table 1 below.

TABLE 1

Sample Line Inductance Values for Various VSD Models

| VSD Model | Line Inductance (µH) |
|---|---|
| 330A | 168 |
| 420A | 115 |
| 780A | 80 |
| 1020A | 60 |
| 1280A | 41 |

Process 400 may continue with act 406, in which the input current estimator 324 determines an input current value. The input current may be a measure of the current available to perform work (e.g., to drive the motor 328). The equation for input current may be as follows:

$$\text{Input Current} = \frac{\text{DC Link Power}}{\sqrt{3} * \text{Line to Line Input Voltage} * 0.96}$$

As described above, the DC link power may be determined in act 402, and the line-to-line input voltage may be determined in act 404. In various implementations, 0.96 may be an assumed power factor value that may be characteristic of the VSD model.

Act 408 may include the input current estimator 324 determining an input current with distortion value. This value may be calculated differently based on the presence of an active harmonic filter component (e.g., active harmonic filter 312) within the VSD. In various implementations, detection of the active harmonic filter component may be performed by the input current estimator 324 and the equation for the input current with distortion value may adjusted accordingly. For example, if the VSD does not include an active harmonic filter component, or if the filter component is disabled, the equation for input current with distortion may be as follows:

$$\text{Input Current with Distortion} = \text{Input Current} * \sqrt{1 + 0.3^2}$$

However, if the VSD does include an active harmonic filter component that is enabled, the equation for input current with distortion may be as follows:

$$\text{Input Current with Distortion} = \text{Input Current} * \sqrt{1 + 0.5^2}$$

Act 410 may include the input current estimator 324 determining a transformer current value. The transformer current value may be supplied to a low voltage control transformer used to power circuits within the VSD 302. For example, the low voltage current transformer may be used to power components such as pumps and fans within the VSD 302. The equation for the transformer current value may be as follows:

$$\text{Transformer Current} = \frac{6000}{\sqrt{3} * \text{Line to Line Input Voltage}}$$

Act 412 may include the input current estimator 324 determining a total input root mean square (RMS) current. The equation for total input RMS current may be as follows:

$$\begin{array}{l}\text{Total Input} \\ \text{RMS Current}\end{array} = \sqrt{\begin{array}{l}\text{Input Current with Distortion}^2 + \\ \text{Transformer Current}^2\end{array}}$$

As described above, the input current with distortion value may be determined in act 408, and the transformer current value may be determined in act 410. Process 400 is shown to conclude with act 414, in which the input current estimator 324 performs an input RMS current response action. In various implementations, the input RMS current response action may include transmitting a signal to the control panel 326 to reduce a chiller load because the input current estimator 324 has determined that the input RMS current is approaching or has exceeded an input current limit. In other implementations, the input RMS current response action may include transmitting a signal to the control panel 326 to display an input current warning message or alarm.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method acts can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. A chiller assembly, comprising:
a compressor, a condenser, an expansion device, and an evaporator connected in a closed refrigerant circuit;
a motor connected to the compressor to power the compressor;
a variable speed drive operable to provide a variable voltage to the motor and a variable frequency to power the motor, the variable speed drive comprising:
a plurality of sensors; and an input current estimator operable to determine an estimated RMS input current based at least in part on sensor data received from the plurality of sensors, wherein the input current estimator is configured to reduce a chiller load in response to the estimated RMS input current exceeding a threshold value; and a control panel to control operation of the variable speed drive and one or more components of the chiller assembly.

2. The chiller assembly of claim 1, wherein the sensor data comprises a DC link voltage value and a DC link current value.

3. The chiller assembly of claim 2, wherein the input current estimator is operable to determine a DC link power value and a line-to-line input voltage value based on the DC link voltage value and the DC link current value and is operable to determine the estimated RMS input current based on the DC link power value and the line-to-line input voltage value.

4. The chiller assembly of claim 3, wherein the input current estimator is operable to determine an input current value based at least in part on the DC link power value and the line-to-line input voltage value and is operable to determine the estimated RMS input current based on the input current value.

5. The chiller assembly of claim 4, wherein the input current estimator is operable to determine an input current with distortion value and a transformer current value, wherein the input current with distortion value is based on the input current value, and wherein the input current estimator is operable to determine the estimated RMS input current based on the input current with distortion value and the transformer current value.

6. A method of controlling a chiller assembly according to an estimated input RMS current, the method comprising:
determining a DC link power value;
determining a line-to-line input voltage value;
determining an input current value based at least in part on the DC link power value and the line-to-line input voltage value;
determining an input current with distortion value based at least in part on the input current value;
determining a transformer current value;
determining a total input RMS current value based at least in part on the input current with distortion value and the transformer current value; and
performing an input RMS current response action.

7. The method of claim 6, wherein the input RMS current response action comprises transmitting a signal to a control panel to reduce a chiller load.

8. The method of claim 6, wherein the input RMS current response action comprises transmitting a signal to a control panel to display an alarm message.

9. The method of claim 6, wherein the DC link power value is based at least in part on a DC link voltage value and a DC link current value.

10. The method of claim 6, wherein the line-to-line input voltage value is based at least in part on a DC link voltage value, an input line frequency value, a line inductance value, and a DC link current value.

11. The method of claim 6, wherein the input current with distortion value is based at least in part on a determination that an active harmonic filter is operable.

12. The method of claim 6, wherein the transformer current value is based at least in part on the line-to-line input voltage value.

13. A processing circuit for a variable speed drive of a chiller assembly, the processing circuit comprising:
a processor; and
memory communicably coupled to the processor and operable to execute a method for controlling the chiller assembly according to an estimated input RMS current, the method comprising:
determining a DC link power value;
determining a line-to-line input voltage value;
determining an input current value based at least in part on the DC link power value and the line-to-line input voltage value;
determining an input current with distortion value based at least in part on the input current value;
determining a transformer current value;
determining a total input RMS current value based at least in part on the input current with distortion value and the transformer current value; and
performing an input RMS current response action.

14. The processing circuit of claim 13, wherein the input RMS current response action comprises transmitting a signal to a control panel to reduce a chiller load.

15. The processing circuit of claim 13, wherein the input RMS current response action comprises transmitting a signal to a control panel to display an alarm message.

16. The processing circuit of claim 13, wherein the line-to-line input voltage value is based at least in part on a DC link voltage value, an input line frequency value, a line inductance value, and a DC link current value.

17. The processing circuit of claim 16, wherein the input line frequency value is obtained from an AC power source.

18. The processing circuit of claim 13, wherein the input current with distortion value is based at least in part on a determination that an active harmonic filter is operable.

19. The processing circuit of claim 13, wherein the transformer current value is based at least in part on the line-to-line input voltage value.

20. The processing circuit of claim 13, wherein the DC link power value is based at least in part on a DC link voltage value and a DC link current value.

* * * * *